Figure 1:
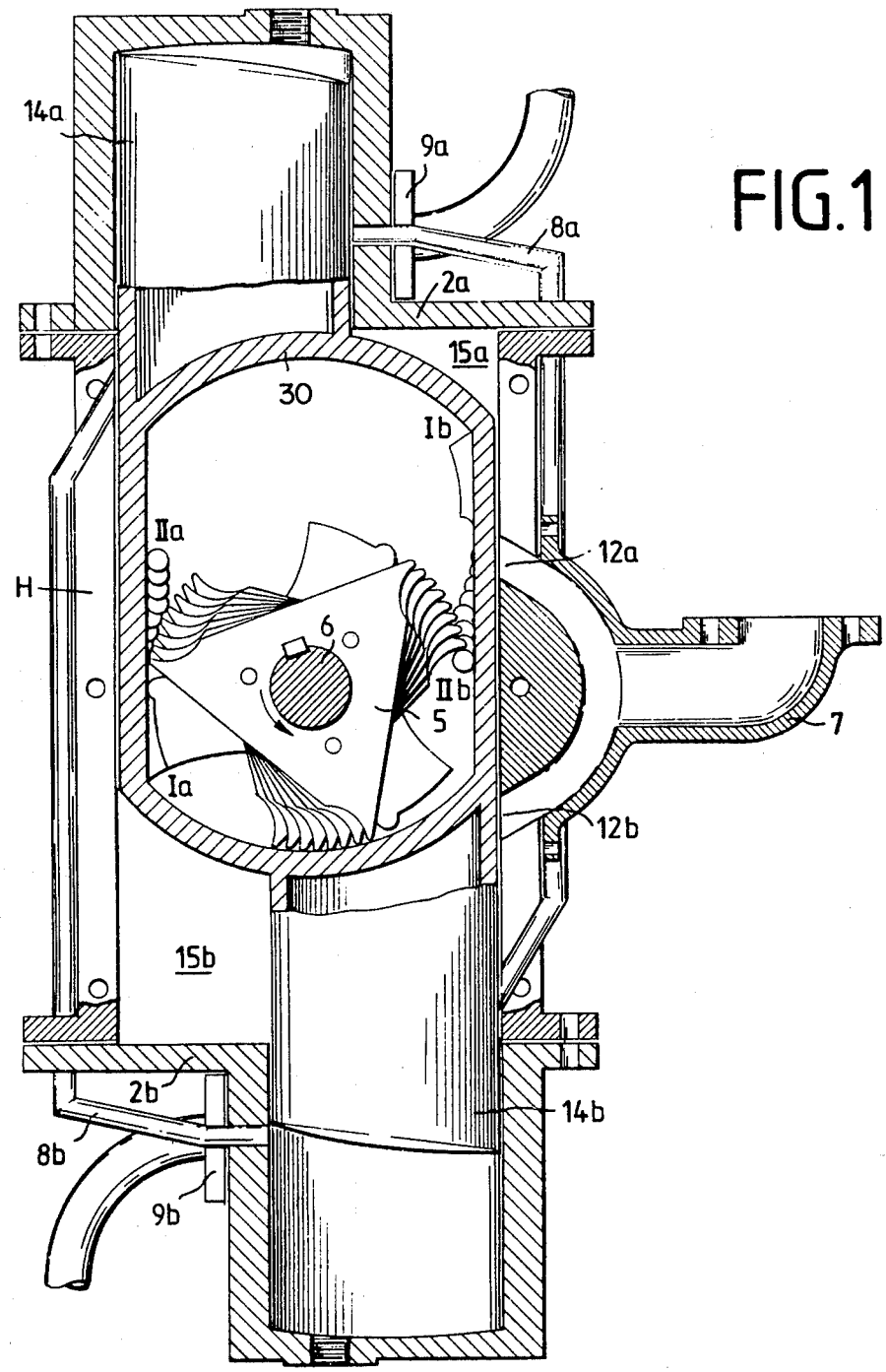

United States Patent [19]

Konther et al.

[11] 4,408,578
[45] Oct. 11, 1983

[54] PISTON ENGINE AS A COMBUSTION ENGINE OR AS A COMPRESSOR WITH OPPOSED CYLINDERS

[76] Inventors: Siegfried Konther; Siegfried Konther-Chamorro, both of Cerro Cora y Azara, San Lorenzo, Paraguay

[21] Appl. No.: 212,290

[22] Filed: Dec. 2, 1980

[30] Foreign Application Priority Data

Mar. 14, 1980 [DE] Fed. Rep. of Germany ....... 3010362

[51] Int. Cl.³ .............................................. F01B 9/00
[52] U.S. Cl. ............................ 123/56 R; 123/179 R; 123/197 R; 92/136; 92/138; 74/132
[58] Field of Search ............. 92/138, 136; 123/197 R, 123/56 R, 179 R, 197 A, 197 AC, 197 C; 74/129, 132

[56] References Cited

U.S. PATENT DOCUMENTS

| 644,753 | 3/1900 | Allen | 92/138 |
|---|---|---|---|
| 1,330,554 | 2/1920 | Schenck et al. | 92/138 |
| 1,999,362 | 4/1935 | Jouch et al. | 92/138 |
| 3,059,268 | 10/1962 | McHale | 92/138 |
| 3,781,144 | 12/1973 | Jacobs | 92/138 |

FOREIGN PATENT DOCUMENTS 462054 7/1928 Fed. Rep. of Germany .
666004 12/1928 France .

Primary Examiner—Paul E. Maslousky
Attorney, Agent, or Firm—Ladas & Parry

[57] ABSTRACT

A piston engine in which opposedly working pistons are rigidly connected to each other by a hollow carrier through which the engine shaft extends. The carrier has interior wall portions with a series of staggered projections thereon. The shaft has a stack of toothed discs fixedly mounted thereon. The series of staggered projections are arranged to successively engage and push the teeth of the toothed discs to apply rotational torque to the engine shaft as the carrier reciprocates.

2 Claims, 12 Drawing Figures

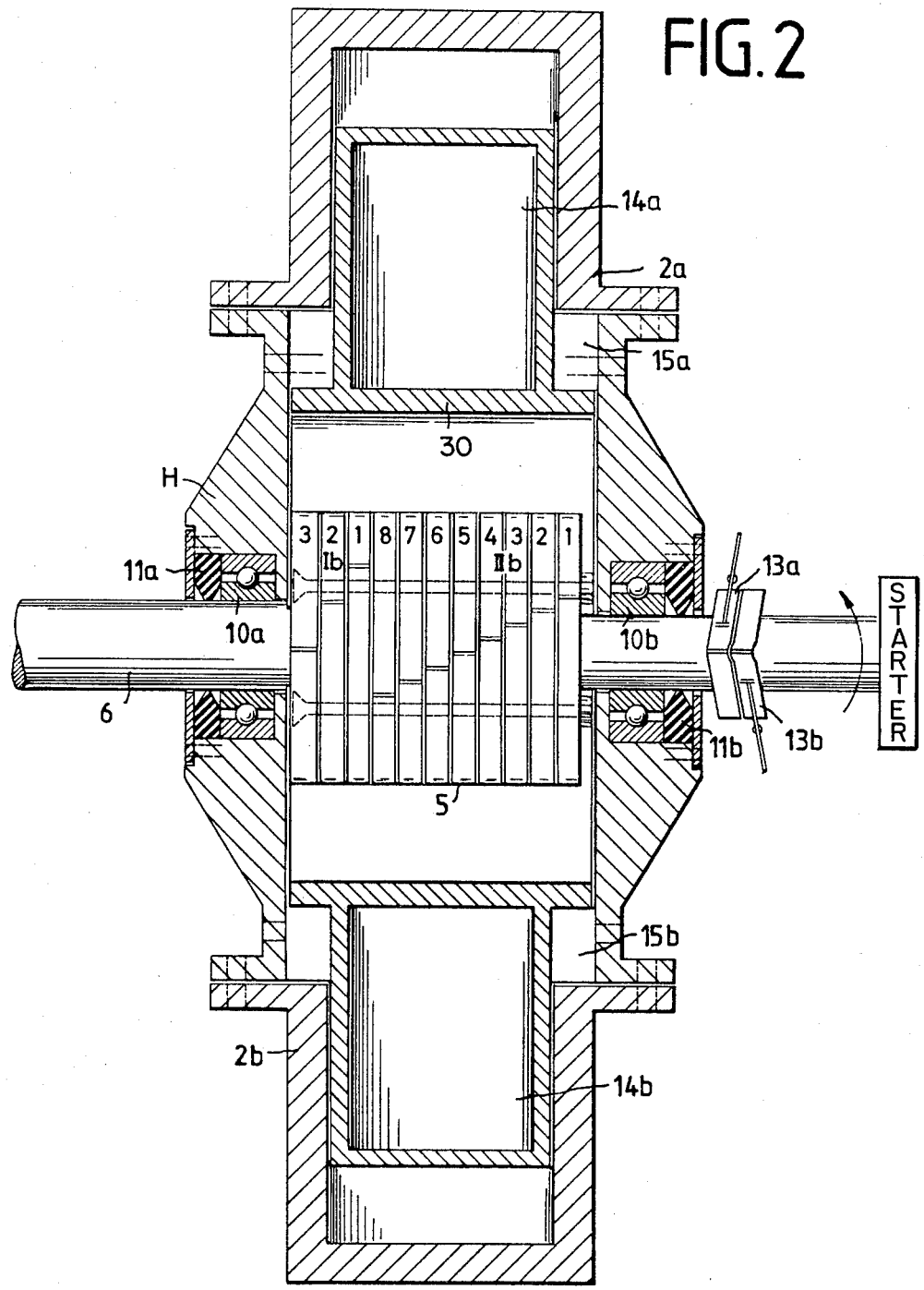

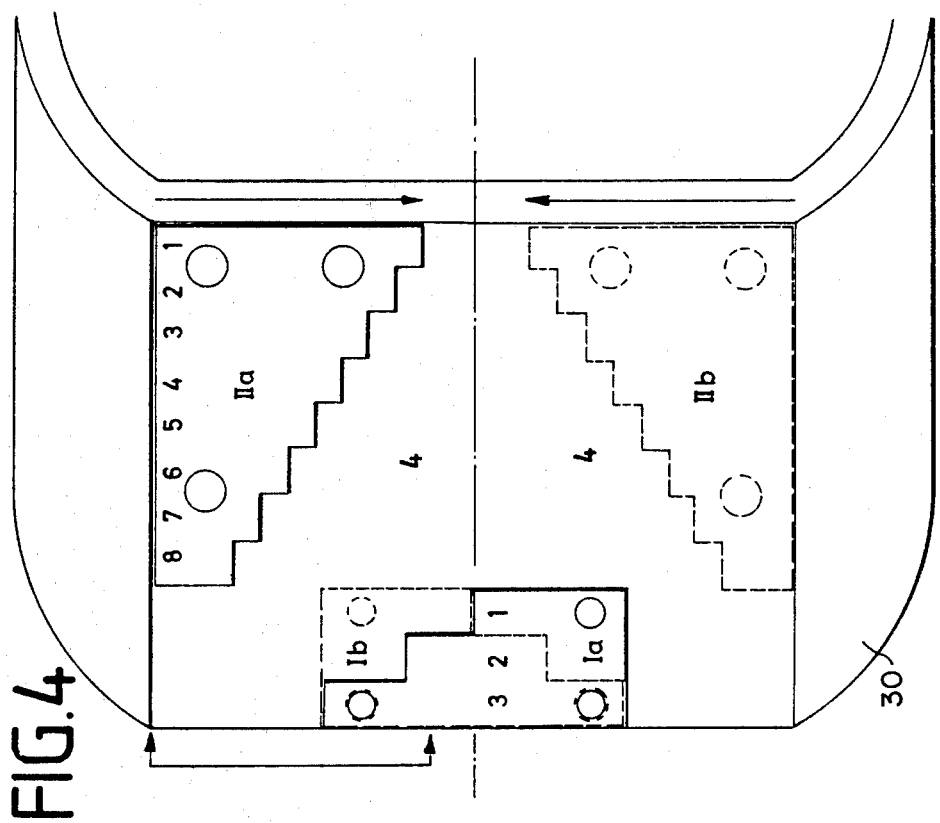
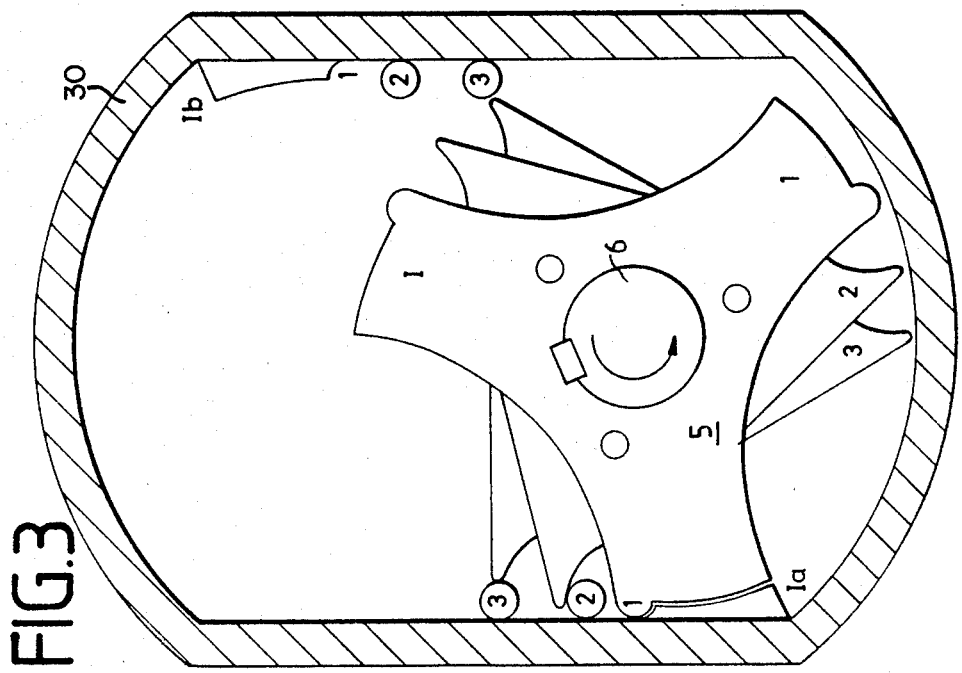

PISTON ENGINE AS A COMBUSTION ENGINE OR AS A COMPRESSOR WITH OPPOSED CYLINDERS

The invention relates to a piston engine as a combustion engine or as a compressor with opposed cylinders, preferably for the powering of land vehicles or mobile work equipment and generators.

Conventional piston engines such as combustion engines, steam engines, compressors and pumps are provided with a crank mechanism for transforming the piston oscillation into the rotation of the motor shaft or vice versa. The numerous deficiencies of a crank mechanism are in general sufficiently known and they need not be presented here in detail; they have led to the continuous undertaking of experiments to realize immediate useful work from the essential phases of a combustion process: namely, compression, combustion, expansion and renewed intake to the combustion space in so called epitrochoidal rotary engines, which in fact do not require the crank mechanism, but which on the other hand have to be produced with extraordinary high precision and which are subject to considerable wear at the cylinder wall based on the necessity of a sealing construction of the three or more edges of the rotary piston at the cylinder wall so that with the increase of wear the efficiency of the rotary engine rapidly decreases.

Therefor, the rotary engine has not become generally accepted, even though it had been hailed as the motor of the future based on the avoided crank mechanism just a decade ago.

However also the other alternative for the construction of a motor as a direct flow machine with separate pressure gas production has to be eliminated for the powering of land vehicles as was proven by numerous experiments. This is not only since turbines also can only be produced through a very expensive precision manufacturing process but more since the large mass of the turbine wheel running with a high rotational speed in the range of 10000 rotations per minute interferes through its gyrostatic effect considerably with the driving behaviour of a vehicle in curves. In addition a large and heavily wearing toothed gearing is required in order to reduce the high rotation speed of the turbine to the rotation speed of the wheels of the vehicle.

Therefor, it is an object of the invention to provide a piston engine wherein the piston and the motor shaft are not connected by a crank mechanism with each other, but wherein the piston stroke acts immediately on the motor shaft via a tangential force.

In accordance with the invention this object is achieved by connecting two opposedly working pistons with each other by a hollow carrier having interior wall portions that move tangentially to the engine shaft on opposite sides thereof during reciprocating movement of the pistons and carrier, and are provided with a main series of staggered projections thereon formed and arranged to successively engage and push the teeth of a corresponding stack of toothed discs mounted to apply torque on the motor shaft. The number of teeth of a single toothed disc corresponds to the number of working strokes of one of the pistons during one rotation of the motor shaft.

In the piston engine according to the present invention the carrier, rigidly connecting two opposingly located pistons, passes tangentially to the motor shaft and engages during the working stroke of one or the other piston the motor shaft via toothed discs, which are constructed so that in each case one carrier projection and its corresponding tooth in accordance with the proceeding stroke are disposed stepwise on the side of the previous pair of protrusion and tooth. Thereby, the force engagement repeats periodically with each working stroke, since the toothed discs can be constructed without problem so that for example a tooth of the first toothed disc, which may have three teeth staggered against each other by angles of 120°, then again engages with the carrier projection constructed for an engagement angle of 60°, when the corresponding piston of a two cycle engine commences its next working stroke.

The starting of such constructed piston engine requires additional cam discs on the motor shaft and follower projections on the carrier, which with the same direction of rotation of the motor shaft can transfer a tangential force of opposite direction relative to the tangential force transferred during operation. The teeth on the cam discs required for the starting are in the following description called pull teeth, whereas those teeth, on the toothed discs which transfer the piston stroke to the motor shaft, for normal steady engine operation are called push teeth.

The size of the motor shaft circumference angle, during which the pushing engagement between the carrier and the stack of toothed discs occurs, depends on the size of the stroke of the given piston. A slow running, long stroke piston for example can engage over an angle of 180°, whereas a rapidly running motor with short strokes of the piston can have a working engagement of only an angle of 60° or 36°, wherein the number of pistons must continuously assure that the motor shaft is continuously driven for the piston engine to give an absolutely continuous and uniform torque. This represents a very considerable advantage of the piston engine of the present invention. The pushing force of the piston is transferred through a constant lever arm, which corresponds to the diameter of the crank shaft toothed discs, whereas in a piston engine with crank mechanism the continuously changing lever arm of the force and the combustion pressures changing in accordance with the combustion diagram superposed resulting in the known very uneven torque curve of a cylinder.

In view of the basic novelty of the piston engine of the present invention further features and advantages of the same are explained in more detail for the better understanding of the invention with reference to the embodiments shown in the accompanying drawings, in which the figures show.

Figure 5:
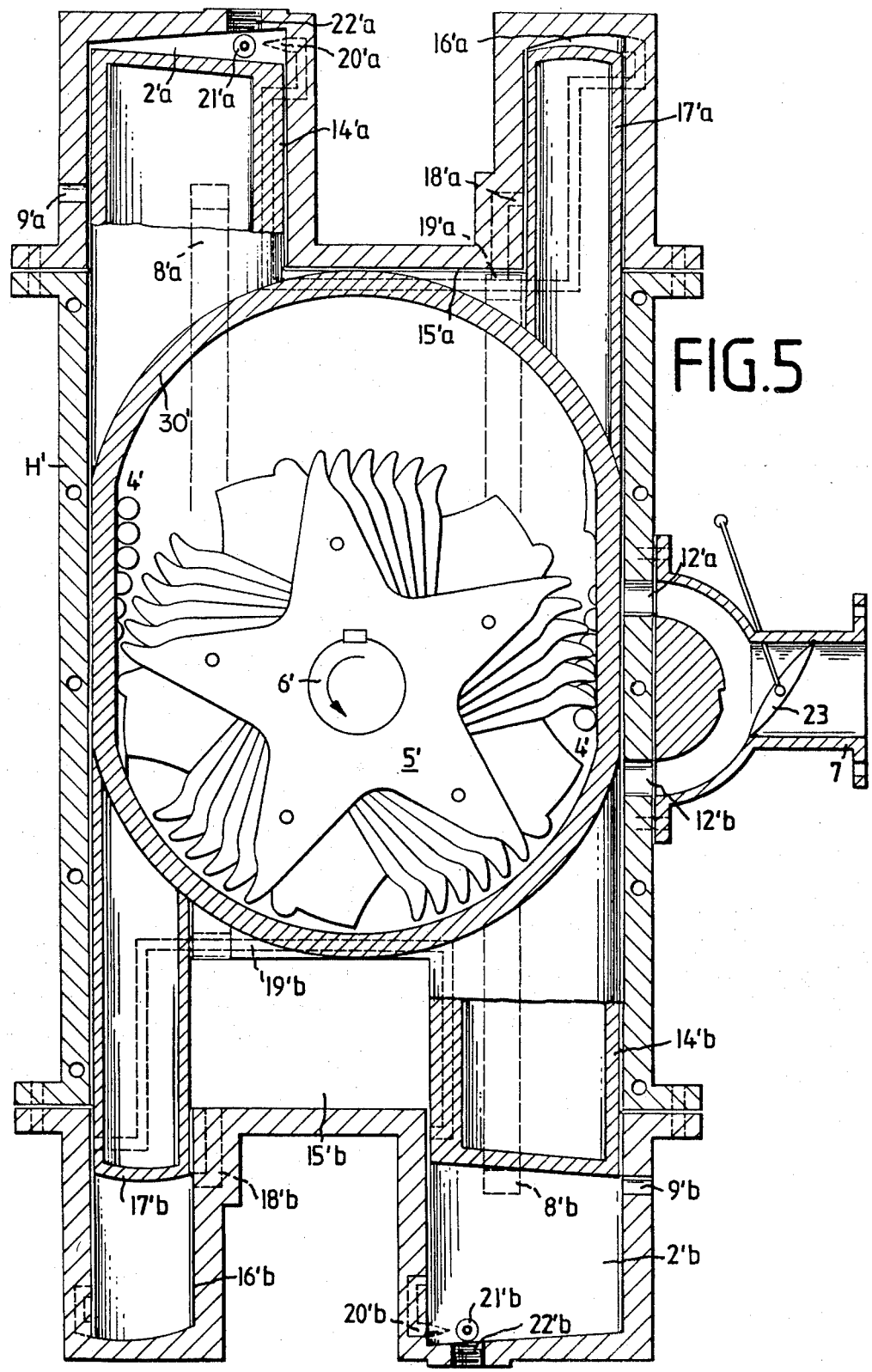
Figure 6:
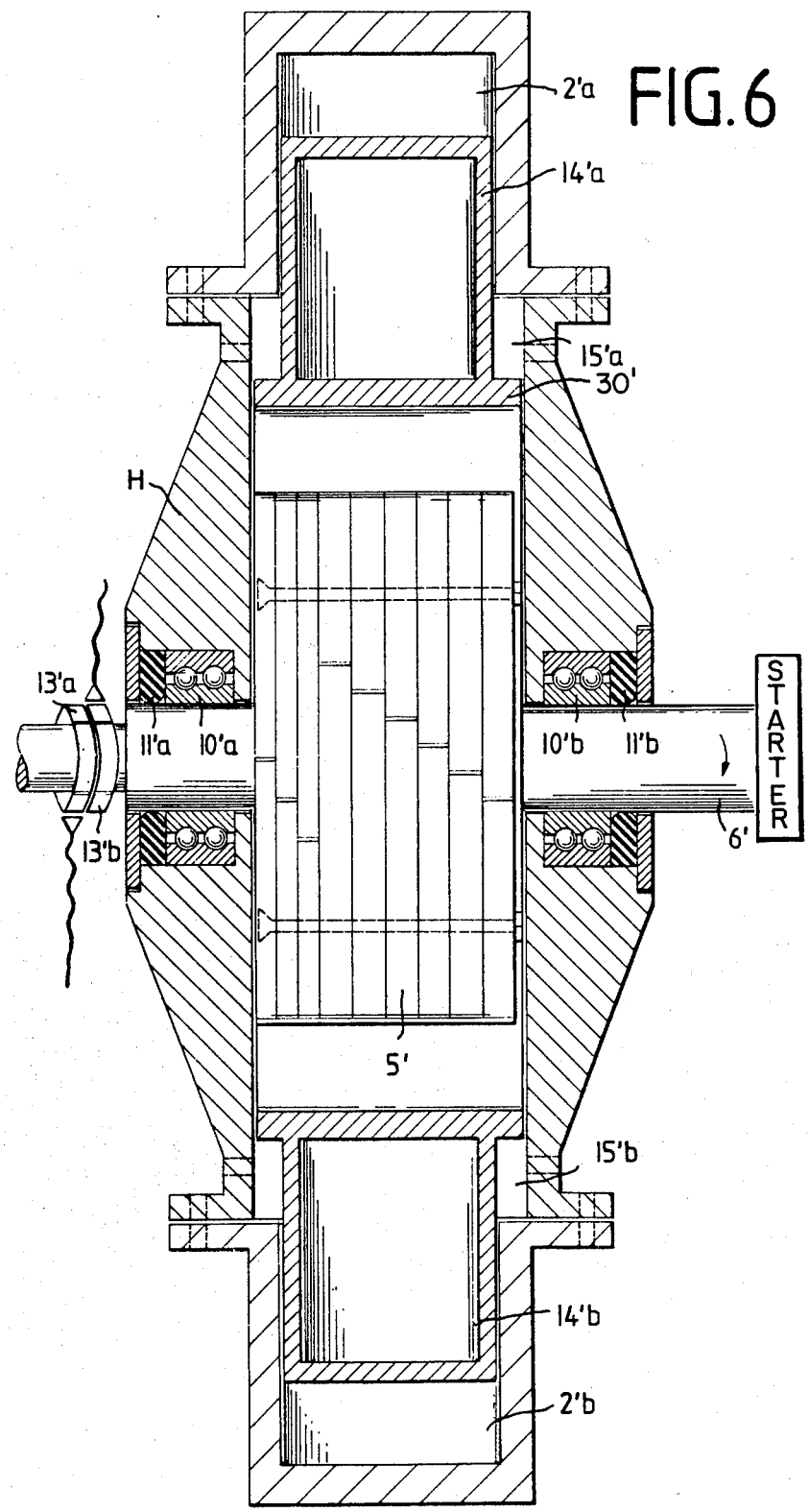
Figure 7:
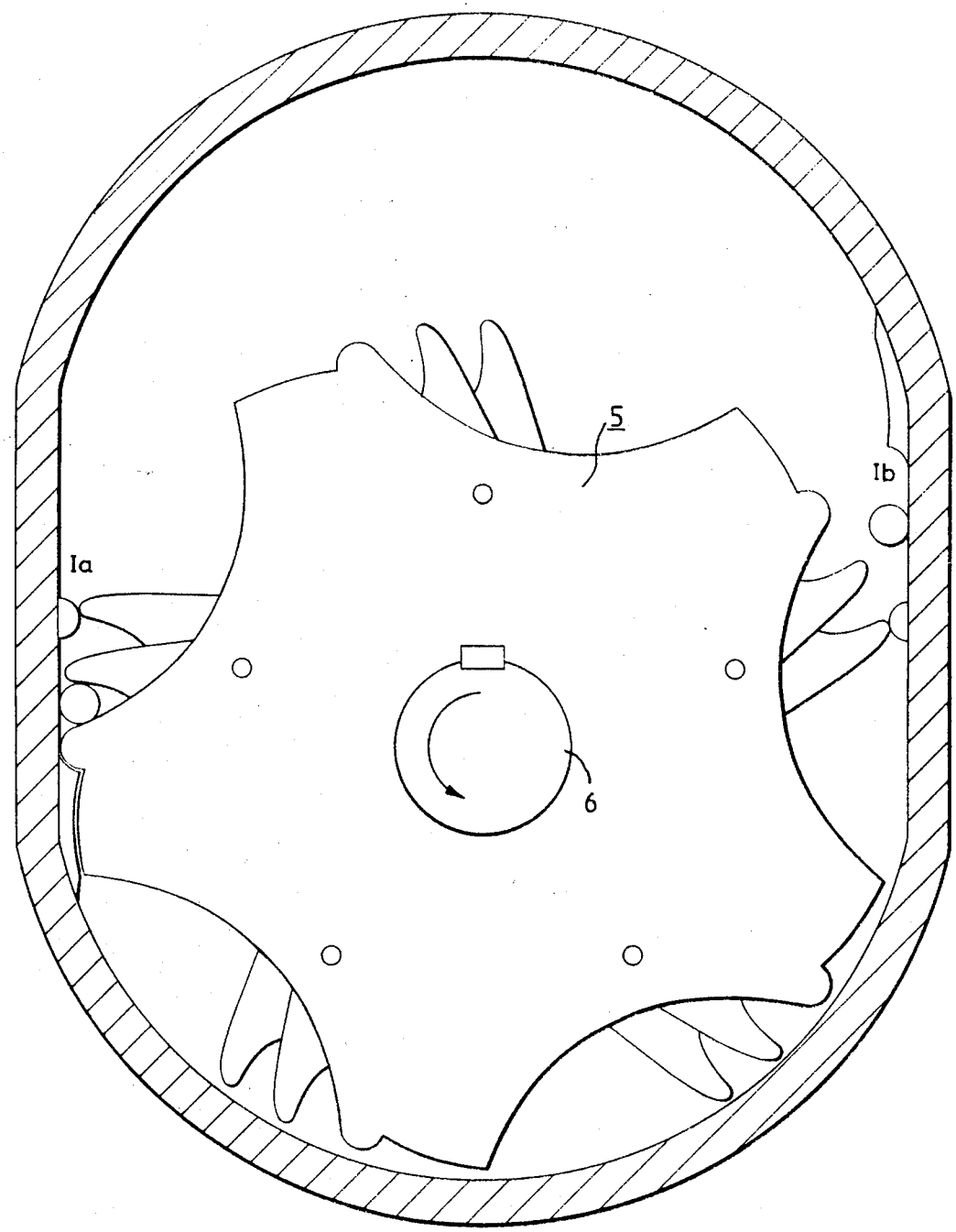
Figure 8:
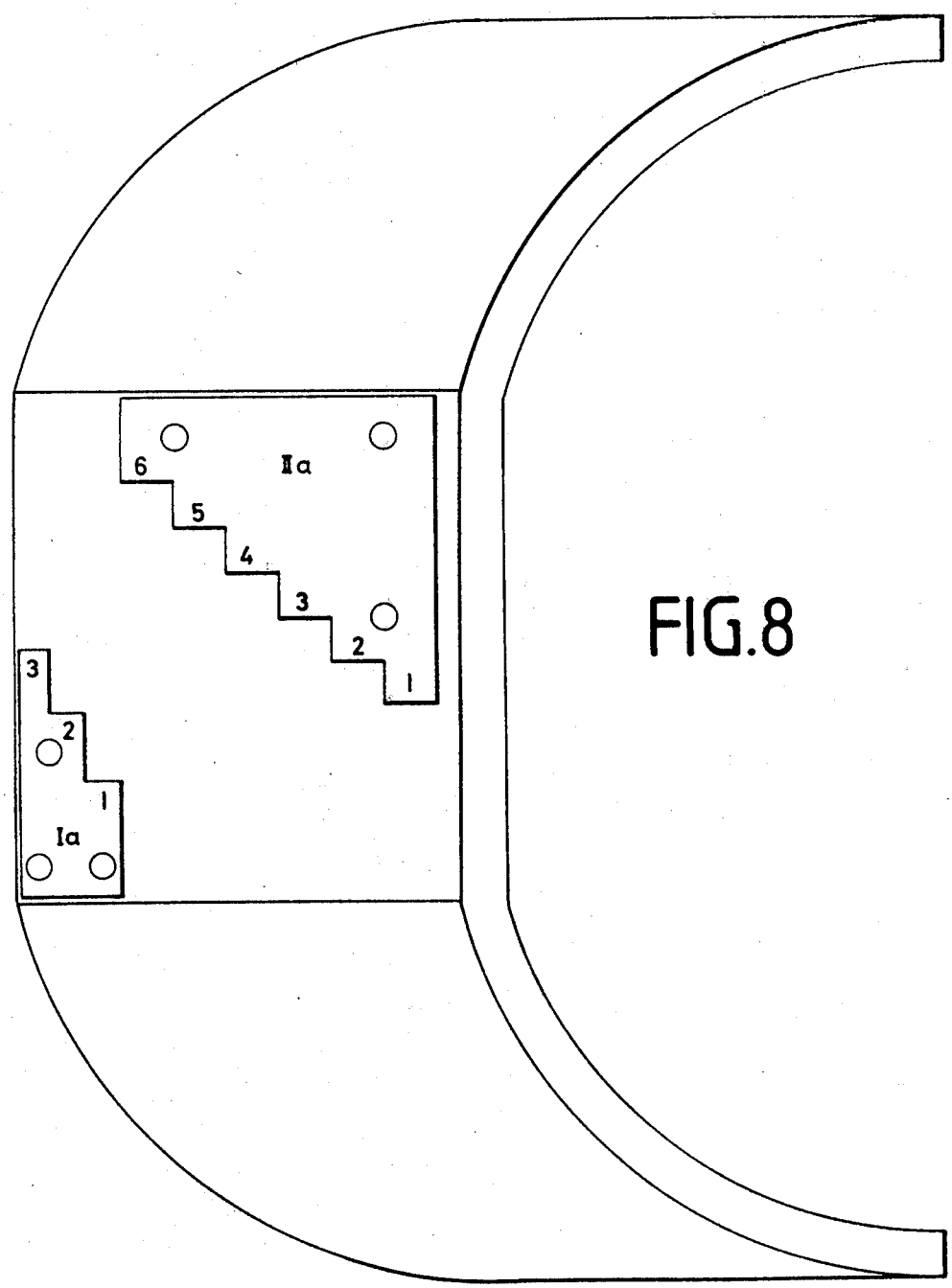
Figure 9:
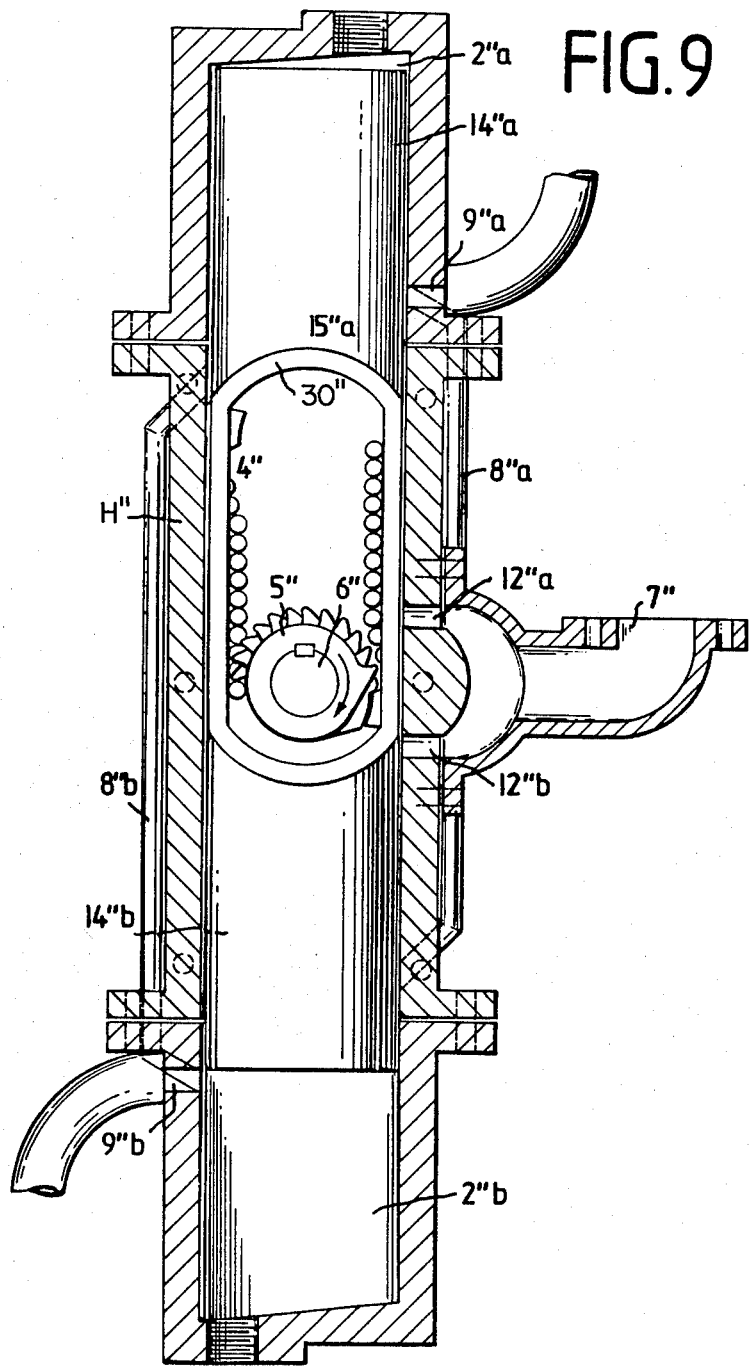
Figure 10:
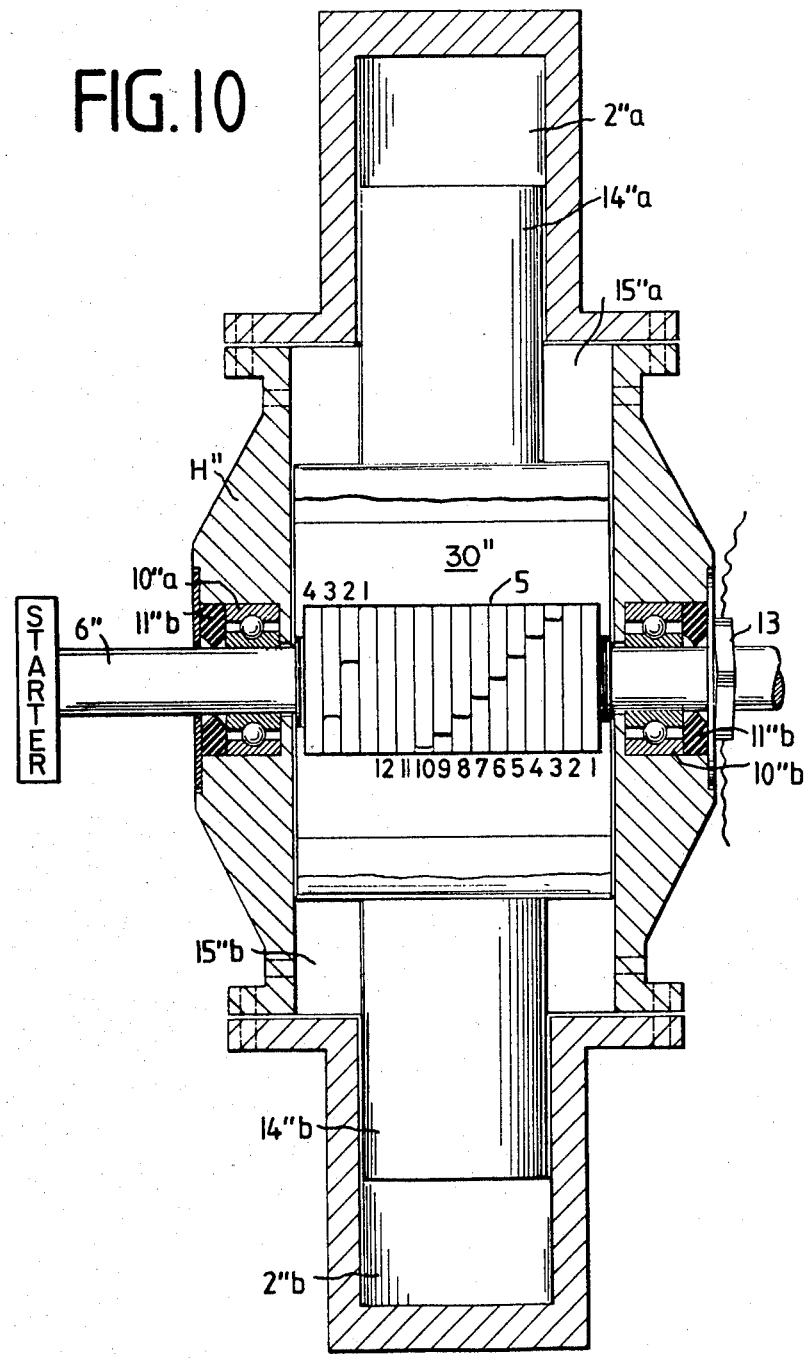
Figure 11:
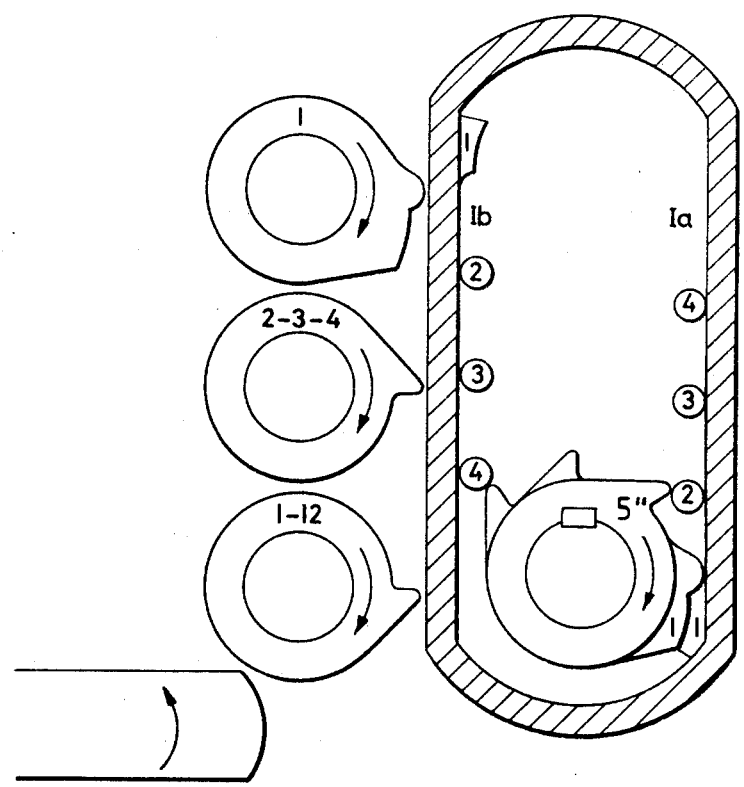
Figure 12:
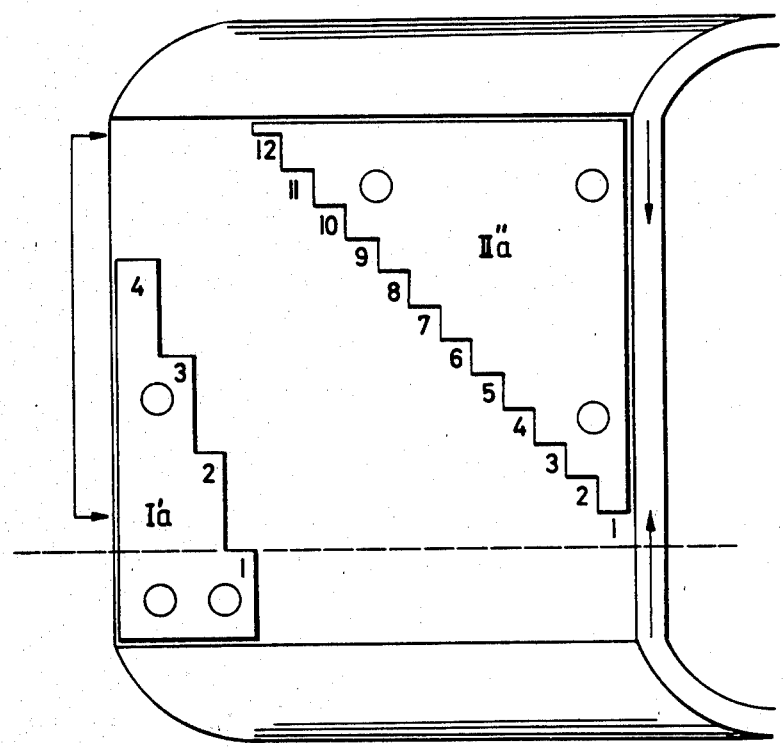

FIG. 1 a cross-section through a first embodiment of a piston engine according to the present invention having a stack of toothed discs comprising eight toothed discs with push teeth as well as three toothed cam discs with pull teeth, wherein each toothed disc has three teeth displaced with respect to each other by an angle of 120°, FIG. 2 a longitudinal sectional view through the piston engine according to FIG. 1, FIG. 3 a cross-sectional view through the carrier of the two pistons not shown in this figure, FIG. 4 a longitudinal sectional view through the carrier, FIG. 5 a cross-sectional view through a second embodiment of the piston engine according to the present invention with a toothed disc stack comprising six toothed disc with push teeth and three toothed cam discs with pull teeth, wherein each toothed disc has five teeth displaced with respect to each other by an angle of 72°, FIG. 6 a longitudinal sectional view through the piston engine according to FIG. 5, FIG. 7 a cross-sectional view through the carrier connecting the pistons of this piston engine, FIG. 8 a longitudinal view through the carrier, FIG. 9 a cross-sectional view through a third embodiment of a piston engine according to the present invention with a stack of toothed discs comprising twelve toothed discs with push teeth and four toothed cam discs with pull teeth wherein each disc has a single tooth, FIG. 10 a longitudinal sectional view through the piston engine according to FIG. 9, FIG. 11 a cross-sectional view through the carrier of the engine according to FIGS. 9 and 10 with separately indicated toothed cam discs with pull teeth and FIG. 12 a longitudinal sectional view through the carrier of this third embodiment.

According to FIG. 1 to 4 the piston engine comprises the motor housing H, the cylinders 2a and 2b, the hollow carrier 30 to whichpistons 14a and 14b are rigidly connected. The interior walls of hollow carrier 30 are provided with staggered projections arranged in groups Ia and Ib and groups IIa and IIb. The carrier also serves as means for charging combustion gas to the cylinders 2a and 2b, the compression of which is produced in the prepressurizing cylinders 15a and 15b and which is fed through the prepressure conduit channels 8a and 8b to the cylinders 2a and 2b.

Coming from the carburetor the gas air mixture enters through intake ports 12a and 12b into the corresponding prepressurizing cylinder 15a or 15b, respectively.

It is apparent from FIGS. 1 to 4 that a stack of toothed discs 5 is connected to the engine shaft 6 for applying rotational torque thereto. As can be seen better from FIG. 2, which represents a longitudinal section through the piston engine of the present invention, this stack of toothed discs comprises in total eleven toothed discs, each having three teeth uniformly distributed around the circumference, which are separated by an an angle of 120°. Referring to FIG. 2, discs 1-3 of group 1b are constructed as toothed cam discs with pull teeth and the discs 1-8 of group IIb are constructed as toothed discs with push teeth. Referring to FIG. 4, the interior walls of the carrier 3 are provided with corresponding staggered projections for engagement with said teeth, on the one hand in the group Ia and Ib for the starting process and on the other hand in the group IIa and IIb for steady operation as indicated by numeral 4 in FIG. 4.

The piston engine according to the present invention, which is constructed here as a combustion engine and is in fact a two cycle, two cylinder combustion engine comprises further the connecting flanges 9a and 9b, the seal rings 11a and 11b, the two three-point cam interruptors 13a and 13b, the connecting elbow 7 to the carburetor and the two motor shaft bearings 10a and 10b.

The combustion engine according to the present invention works as follows:

For starting, the motor shaft 6 is as usual, rotated by a usual starter provided for this purpose until the required combustion pressure or ignition conditions are reached within the cylinders 2a and 2b. During this starting process solely the pull teeth 1-3 of the toothed cam discs engage the carrier projections in the groups Ia as well as Ib, on the interior walls of the hollow carrier 30, and move alternating successively first engaging projections on the one side of the carrier and then on the other oppositely disposed side of the carrier and oscillate the carrier 30 into working direction until the required combustion pressure has built up in the cylinders 2a and 2b. Then the ignition follows and the engine operation begins. The engagement of the pull teeth is thereby terminated and the consequent phase shift of the carrier motion results in that the pull teeth of the toothed cam disc only extend into the spaces between the projection groups Ia and Ib, which are already leading or are lagging behind, respectively.

During the working operation of the pistons 14a and 14b again the teeth of the individual toothed discs of the stack of toothed discs 5 successively engage the opposingly located groups IIa and IIb of the interior projections on the carrier 30. On each side of the motor shaft the engagement occurs tooth by tooth after during an angle of rotation of the motor shaft of 120° in each case. As soon as the last toothed disc on the one side of the motor shaft has terminated its engagement, then the first toothed disc of the stack of toothed discs 5 on the opposingly located side is pushingly engaged by a carrier projection of group IIa or IIb, or as the direction of movement of the carrier is reversed.

Each of the pistons 14a and 14b is engaged with the corresponding carrier projection groups IIb and IIa, respectively via the described stack of toothed discs 5 during a rotational angle of the motor shaft 6 of 60° for each stroke (working stroke). During the then following suction and compression stroke no tooth engagement is coordinated to this piston, for example piston 14a, that is a total angle of 120° after the first engagement of the stack of discs 5 with the corresponding toothed carrier projections IIb, a renewed engagement of the first tooth of the stack of toothed discs 5 into the carrier projections IIb occurs, however at this moment already the next working stroke of the piston 14a begins.

The piston 14g operates correspondingly so that the motor shaft 6 and its stack of toothed discs 5, respectively, are continuously driven either on the one side or on the other side by one of the teeth of the two groups IIb and IIa. The motor shaft is therefore driven in a uniform rotation with predetermined torque and can transfer the power produced in this way for example through a corresponding transmission to the wheels of a motor vehicle.

During a full rotation of the motor shaft 6 each of the two pistons 14a and 14b performs three power strokes. Since as mentioned above each pushing engagement during a working cycle covers an angle of 60° of the crank shaft rotation, each of the two carrier projection groups IIa and IIb, respectively, is in pushing engagement intermittently after an angle of 60° rotation of the motor shaft, which results in a drive of the motor shaft for a full 360° angle.

It can be further recognized from FIG. 1 that simultaneously with the compression, for example within the cylinder 2b, also a compression within the prepressurizing cylinder 15b occurs. The air compressed there is shifted during the upward stroke of the piston 14b via the prepressure feeding channel 8a into the cylinder 2a, which runs during this work operation just through its suction phase. The same situation follows in reversed direction in each case during the compression of the piston 14a within the cylinder 2a as well as of the prepressure generating cylinder 15a.

The carrier cross-sections according to FIG. 3 and the longitudinal section of the carrier according to FIG. 4 show clearly the construction and position of the carrier projection group IIa, Ia, IIb and Ib.

In order to provide a better overview in the drawing according to FIG. 1 the two with the corresponding carrier projections have been deleted. It has to be further mentioned that the intake opening for the gas-air mixture to be combusted is only seemingly covered by the carrier according to FIG. 1. The same holds for the intake of the compressed air, which enters via the prepressure feed channel 8a into the cylinder 2a, since these entrances are located behind the section plane of FIG. 1.

The following rule follows in principle for a piston engine according to the invention as is also shown in the following embodiments:

When stacks of toothed discs are employed with individual toothed discs having three teeth uniformly distributed over the circumference, that is by an angle of 120° staggered, then the engagement angle for each piston and working stroke is an angle of rotation of 60°. In order to generate a full rotation of the motor shaft 6 in total $2 \times 3 = 6$ working strokes of the pistons 14a and 14b are required.

When a stack of toothed discs is provided wherein the teeth of one toothed disc are staggered against each other by 72°, then each disc has to have five push teeth and the engagement angle for each piston is 36°. After five working strokes therefor the motor shaft 6 is rotated by 180°. Since in the machine illustrated herein as an embodiment, two pistons 14a and 14b are provided having alternating working strokes, a full rotation of the motor shaft 6 is generated by in total $2 \times 5$ working strokes of the pistons 14a and 14b.

Correspondingly, employing a toothed disc with only a single tooth the tooth pitch is 360° and the engagement angle for each piston and each working stroke is 180°. Therefor, two working strokes are required for each rotation of the motor shaft 6.

Stroke length, size of the engagement angle, number of teeth for each toothed disc within the stack of toothed discs 5 and the number of cylinders can be varied over a wide range in the piston engine of the present invention in order to provide the most favorable operating conditions for this machine.

The piston engine according to the present invention is because of the eliminated crank mechanism particularly safe against engine damages, which as is known because of the unfavorable load conditions prevailingly occur within a cranking mechanism, which is better understandable after the preceding description of a first embodiment having the construction of a two cycle, two piston combustion engine.

The piston engine according to the present invention shows compared with the conventional engine the additional advantage of an absolutely uniform torque curve as seen over the total angle of rotation of the motor shaft, since the lever arm of the torque remains constant and corresponds to the effective radius of the stack of toothed discs as well as the stroke of the pistons 14a and 14b in the embodiment according to the FIGS. 1 and 2.

Of course, a four cycle combustion engine can be built according to the same principles, only a doubling of the number of cylinders is required with the same number of working strokes.

Similarly a doubling of the power can be obtained by placing a further equal motor unit onto the same motor shaft.

The combustion engine of the present invention is particularly well suited as a drive for slowly moving land vehicles, for example for tractors.

In addition, the power output of a combustion engine in accordance with the present invention is substantially larger compared with that of conventional engines of the same stroke volume, since in accordance with the invention the effective prepressurizing can be used without increased expense.

Without limitation, the construction principle of the present invention cannot only be applied to engines of low or very high rotation speed, but the range of application covers also compressors of any power stage. An additional embodiment for a two cycle, two cylinder combustion engine is presented in FIGS. 5-8, wherein the stack of toothed discs 5' is composed of toothed discs having five teeth distributed over their circumference which coact with the correspondingly constructed carrier projections, which are again subdivided into the groups I'a and b as well as II'a and b. The functioning of this combustion engine is incidentally exactly the same as that according to the first embodiment, so that for simplicity in this respect reference is made to the description of the first embodiment.

Employing toothed discs with five teeth as mentioned results in that with a tooth pitch of 72° the engagement angle for each piston and stroke is 36° and five working strokes for each cylinder, that is in total $5 \times 2 = 10$ working strokes are required for the uniform drive of the motor shaft 6, in case in total two cylinders are provided.

Finally, a last embodiment of a two cycle, two cylinder combustion engine is shown in the FIGS. 9 to 12, wherein the individual discs have only one tooth each. This modification is particularly suitable for slow running, long stroke pistons, wherein the engagement angle for each piston and each working stroke is 180° and then the opposingly located piston becomes effective. For each working stroke of the two cylinders contributing a full rotation is performed.

In FIGS. 5-8 and FIGS. 9-12, the various operational parts have reference numerals corresponding to those of FIGS. 1-4.

We claim:

1. A piston engine comprising a housing for opposed cylinders with reciprocating pistons therein adapted during engine operation to effect rotation of an engine shaft mounted in said housing, in which two opposedly working pistons are rigidly connected to each other by a hollow carrier through which the engine shaft extends, said carrier having interior wall portions that move tangentially to the engine shaft on opposite sides thereof during reciprocating movement of the pistons and carrier, said wall portions being provided with a main series of staggered projections thereon and said engine shaft being provided with a first corresponding stack of toothed discs fixedly mounted thereon, said main series of staggered projections being formed and arranged to successively engage and push the teeth of said first corresponding stack of toothed discs to apply rotational torque to the engine shaft as the carrier reciprocates, the number of teeth on a single disc corresponding to the number of working strokes of a piston for each revolution of the shaft.

2. A piston engine according to claim 1, in which said wall portions of the carrier are provided with a further series of staggered projections thereon formed and arranged to successively engage and be pulled by the teeth of a second corresponding stack of toothed discs mounted on the engine shaft, when the engine shaft is rotated by a starter during a starting operation before normal operation of the engine, whereby the pistons and carrier are reciprocated by said pulling action to produce ignition conditions in the opposed cylinders, whereupon the starting operation is superseded by the pushing action of the main series of staggered projections on the teeth of the first corresponding stack of toothed discs to effect rotation of the engine shaft for normal engine operation.

* * * * *